United States Patent
Shoji et al.

(10) Patent No.: US 6,572,476 B2
(45) Date of Patent: Jun. 3, 2003

(54) GAME SYSTEM AND COMPUTER READABLE STORAGE MEDIUM

(75) Inventors: Tatsuya Shoji, Yokohama (JP); Masaaki Nagakura, Yokohama (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/820,560

(22) Filed: Mar. 29, 2001

(65) Prior Publication Data

US 2001/0029203 A1 Oct. 11, 2001

(30) Foreign Application Priority Data

Apr. 10, 2000 (JP) ........................................ 2000-108259

(51) Int. Cl.⁷ ............................ A63F 13/00; G06T 11/00
(52) U.S. Cl. .......................................... 463/33; 345/472
(58) Field of Search ................................ 463/1–2, 5, 7, 463/30–34, 37, 49–56; 273/461; 345/592, 472, 424, 418, 426, 619, 629, 856–857, 788, 952; 359/802

(56) References Cited

U.S. PATENT DOCUMENTS

| | | | | |
|---|---|---|---|---|
| 5,283,560 A | * | 2/1994 | Bartlett | 345/729 |
| 5,754,348 A | * | 5/1998 | Soohoo | 359/802 |
| 5,818,455 A | * | 10/1998 | Stone et al. | 345/619 |
| 5,986,662 A | * | 11/1999 | Argiro et al. | 345/424 |
| 6,038,367 A | | 3/2000 | Abecassis | |
| 6,346,938 B1 | * | 2/2002 | Chan et al. | 345/419 |
| 6,377,277 B1 | * | 4/2002 | Yamamoto | 345/629 |
| 6,388,684 B1 | * | 5/2002 | Iwamura et al. | 345/788 |

FOREIGN PATENT DOCUMENTS

| | | |
|---|---|---|
| EP | 0 830 879 | 3/1998 |
| EP | 0 893 149 | 1/1999 |
| EP | 0 971 311 | 1/2000 |
| JP | 06-067803 | 3/1994 |
| JP | 7-181934 | 7/1995 |
| JP | 8-024441 | 1/1996 |
| JP | 10-263-205 | 10/1998 |
| JP | 11-146979 | 6/1999 |

OTHER PUBLICATIONS

Feb. 26, 1999 "Amusement Industry, vol. 28 the Mach number" published on Feb. 26, 1999, Completed Product of Video Games (Cockit & Upright Type) Silent Scope.

* cited by examiner

*Primary Examiner*—Kim Nguyen
(74) *Attorney, Agent, or Firm*—Jordan and Hamburg LLP

(57) ABSTRACT

It is an object of present invention to effectively, separately use a game field image and an enlarged image relating to the neighborhood of a sight postion in the game field image. In a game system executing a shooting simulation of the like, a game field image is displayed on a screen of a predetermined monitor by a computer of the game system, a sight position in the game field image is changed in accordance with a player's postion select operation conducted to a predetermined input device, and an enlarged image relating to a predetermined range including the sight postion is displayed on the screen of the monitor. Further, a magnification of the enlarged image relative to the game field image is changed in accordance with a player's magnification switch operation conducted to the input device.

12 Claims, 9 Drawing Sheets

GAME SYSTEM AND COMPUTER READABLE STORAGE MEDIUM

BACKGROUND OF THE INVENTION

1. Field of the Invention

The present invention relates to a game system for playing a game using an image expressing a game field and an image showing a partly enlarged game field.

2. Description of the Related Art

As a game system of this type, there is disclosed by, for example, Japanese Patent Application Laid-Open No. H07-181934, a system wherein a game field image expressing a building street in which a target is hidden is displayed on a monitor screen, an enlarged image relating to a certain range centered around a shooting position at which a mimic gun is aimed is displayed on a sub-monitor screen in a sight attached to the mimic gun. According to this system, a player can locate a target while observing the game field image and accurately aim at the target while referring to the enlarged image projected on the sight, and it is possible to faithfully reproduce a sense of long distance shooting and to thereby develop interest in the game.

The above-stated conventional shooting simulation game presupposes that a mimic gun is used as an input device. However, if a player plays a shooting simulation game using a home video game device, a generalized game controller (which is sometimes referred to as a game pad or the like) pertaining to the video game device is often used as an input device. Naturally, such a generalized game controller has no sight, so that the above-stated display method cannot be adopted. Needless to say, the same problem occurs to a game system, besides the home game system, which is not provided with a mimic gun as a game controller such as, for example, an arcade game machine employing a generalized housing. Further, the same problem may possibly occur as to how to deal with a partially enlarged image obtained through not only a shooting simulation game but also a magnifying optical system such as a telescope, binoculars or a camera, if the enlarged image is used for a game.

SUMMARY OF THE INVENTION

An object of the present invention is to provide a game system capable of effectively using an image showing a game field and an image showing an enlarged neighborhood of a sight position set in the game field image separately even in an environment in which a dedicated controller such as a mimic gun cannot be used and to provide a storage medium suited to be used for the game system.

Now, the present invention will be described. To facilitate understanding the present invention, reference symbols in attached drawings in parentheses are added. The present invention should not be, however, limited to modes illustrated in the drawings.

A first embodiment of the invention is a game system characterized by comprising: a first display control device (13) for displaying a game field image (100) on a predetermined monitor screen; a sight position select device (13) for changing a sight position (SP) in the game field image in accordance with a player's position select operation conducted to a predetermined input device (22); a second display control device (13) for displaying an enlarged image (102) relating to a predetermined range including the sight position on the monitor screen; and a magnification change device (13) for changing a magnification of the enlarged view relative to the game field image in accordance with a player's magnification switch operation conducted to the input device.

According to this game system, since the enlarged image relating to the predetermined range including the sight position set on the game field image is displayed on the game field image, a player can check the details of the neighborhood of the sight position while referring to the enlarged image. Besides, the magnification of the enlarged image can be changed. Due to this, if the player wants to check details using the enlarged view, the magnification of the enlarged view is increased, and if the player wants to preferentially check the overall image using the game field image, the magnification of the enlarged view is reduced to thereby minimize a range in which the enlarged image and the game field image overlap each other. In this way, it is possible to appropriately adjust the size of the enlarged image depending on circumstances. Thus, it is possible to effectively, separately use an image showing a game field and an image in which the neighborhood of a sight position set in the game field image is enlarged. It is noted that even if the magnification of the enlarged image is changed, the range included in the enlarged image is fixed. Namely, the angle of view of the enlarged image is constant.

Another aspect of the first embodiment is characterized in that the second display control device switches over display and non-display of the enlarged view in accordance with a player's display switch operation conducted to the input device in the game system. Thus, by switching the enlarged image to a non-display state if the display thereof is unnecessary, the enlarged image is eliminated from the field image, thereby making it possible to visually check all the corners of the game field image without being obstructed by the enlarged image.

A second embodiment of the invention is a game system comprising: a first display control device (13) for displaying a game field image (100) on a predetermined monitor screen; a sight position select device (13) for changing a sight position (SP) in the game field image in accordance with a player's position select operation conducted to a predetermined input device (22); a second display control device (13) for displaying an enlarged view (102) relating to a predetermined range including the sight position on the monitor screen; and a transparency processing device (13) for allowing observation of the game field image in back of the enlarged view by transmitting said enlarged view to a predetermined transparency.

According to this embodiment, the enlarged image is set in a semitransparent state and superposed on the game field image, thereby making it possible for the player to check simultaneously the content of the enlarged image and the content of the portion of the game field image located in the back of the enlarged image. Accordingly, it is possible to simultaneously grasp the overall image using the game field image and to grasp the details of the neighborhood of the sight position using the enlarged image without conducting a switch operation to the input device, thereby making it possible for the player to grasp lot of information in a short period of time.

Another aspect of the second embodiment of the invention is characterized by comprising a transparency change device for changing the transparency of the enlarged view in accordance with a player's transparency change operation conducted to the input device in the game system.

According to this aspect, by adjusting transparency, the degree to which the game field image in the back of the enlarged image can be checked through the enlarged image, i.e., the clearness of the game field image can be adjusted. Accordingly, the player can arbitrarily adjust the transparency of the enlarged image depending on circumstances such as a circumstance where which is to be preferentially displayed, the enlarged image or the game field image, thereby making it possible to derive the function and advantage by the transparency processing to capacity.

A third embodiment of the invention is a game system comprising: a main monitor (9) provided to display a predetermined game field image (100); a game controller (20) having a pad-like housing (21) capable of being held by a player with player's hands, and having an input device (22) including at least one operation member (e.g., 24) operated by the player and provided on the housing, and provided with a sub-monitor (32) allowing observation from externally of the housing; a control device (13) for executing a predetermined game while referring to a player's operation conducted to the input device, and characterized in that the control device comprises: a first display control device for displaying the game field image on a screen of the main monitor; a sight position select device for changing a sight position (SP) in the game field image in accordance with a player's position select operation conducted to the input device; and a second display control device for displaying an enlarged view relating to a predetermined range including the sight position on a screen of the sub-monitor.

According to this embodiment, even a pad-like game controller designed in view of versatility often has a monitor provided on the housing thereof. Due to this, it is possible to display the enlarged view near at the player's hand while utilizing the monitor as a sub-monitor. Thus, it is possible to check the game field image with the main monitor and check the enlarged image with the sub-monitor and to accurately, easily obtain information which the player wants from the both images.

Another aspect of the third embodiment of the invention is characterized in that the game controller is provided with a portable information terminal (23) attachable to and detachable from the housing, and the sub-monitor is provided at the portable information terminal in the game system. According to this aspect, even with the pad-like game controller designed in view of versatility, there exists the game system realizing functions such as a function of utilizing the portable information terminal, which is installed to the housing, as, for example, a medium storing data corresponding to the results of a user's play. Due to this, the monitor provided as a device for displaying various information on the portable information terminal in such a system is effectively utilized as a sub-monitor for displaying the enlarged image, thereby making it possible to easily realize the game system.

Another aspect of the above described embodiments is characterized in that a display position of the enlarged view is set so that the sight position in the enlarged view and the sight position in the game field position accord with each other in the game system. Accordingly, it is possible to separately utilize the enlarged image and the game field image by checking the neighborhood of the sight position with the enlarged image and checking the state of surroundings which do not include the enlarged image with the game field image.

A fourth embodiment of the invention provides a computer readable storage medium (15) recording a program for allowing a computer (13) constituting a game system to function as: a first display control device for displaying a game field image (100) on a predetermined monitor screen; a sight position select device for changing a sight position (SP) in the game field image in accordance with a player's position select operation conducted to a predetermined input device (22); a second display control device for displaying an enlarged image (102) relating to a predetermined range including the sight position on the monitor screen; and a magnification change device for changing a magnification of the enlarged view relative to the game field image in accordance with a player's magnification switch operation conducted to the input device. If the program recorded on this recording medium is read and executed by the computer, the game system of the first embodiment can be realized.

A fifth embodiment of the invention provides a computer readable storage medium (15) recording a program for allowing a computer (13) constituting a game system to function as: a first display control device for displaying a game field image (100) on a predetermined monitor screen; a sight position select device for changing a sight position (SP) in the game field image in accordance with a player's position select operation conducted to a predetermined input device (22); a second display control device for displaying an enlarged view (102) relating to a predetermined range including the sight position on the monitor screen; and a transparency processing device allowing observation of the game field image in back of the enlarged view by transmitting said enlarged view to a predetermined transparency. If the program recorded on this recording medium is read and executed by the computer, the game system of the second embodiment can be realized.

A sixth embodiment of the invention provides a computer readable recording medium (15) recording a program for allowing a computer (13), applied to a game system comprising a main monitor (9) provided to display a predetermined game field image (100); a game controller (20) having a pad-like housing (21) capable of being held by a player with player's hands, and having an input device (22) including at least one operation member (e.g., 24) operated by the player and provided on the housing, and provided with a sub-monitor (32) allowing observation from externally of the housing, and constituting the game controller, to function as: a first display control device for displaying the game field image on a screen of the main monitor; a sight position select device for changing a sight position (SP) in the game field image in accordance with a player's position select operation conducted to the input device; and a second display control device for displaying an enlarged view (102) relating to a predetermined range including the sight position on a screen of the sub-monitor. If the program recorded on this recording medium is read and executed by the computer, the game system recited in the third embodiment can be realized.

In the invention recited in each embodiment, the game field image is constituted as an image which views all or a part of the state of a virtual space, in which a game progresses, from a specific viewpoint. If the game system is constituted to execute, for example, a shooting simulation game, the game field image can be constituted as an image which expresses, for example, a space, in which a shooting target is hidden, from the viewpoint of a virtual shooter (which is a player operation target character). The sight position in the game field image is a point noted by the player for some purpose in the game field image and corresponds to, for example, a point set as a shooting target in the shooting simulation game. The present invention is not, however, limited to the game system executing the shooting simulation game. The enlarged image is a concept indicating an image by which a game field can be observed through a telescope, binoculars or a magnifying optical system provided at a camera or the like. The present invention is applicable to various types of game systems requiring such images. The pad-like game controller exhibits a generally flat outline and is a game controller used while the player holds the game controller with both hands from laterally. A magnetic storage medium, an optical storage medium a magneto-optical storage medium, a semiconductor storage element and other various storage devices are included in the recording medium according to the present invention.

DESCRIPTION OF THE PREFERRED EMBODIMENTS

Figure 1:
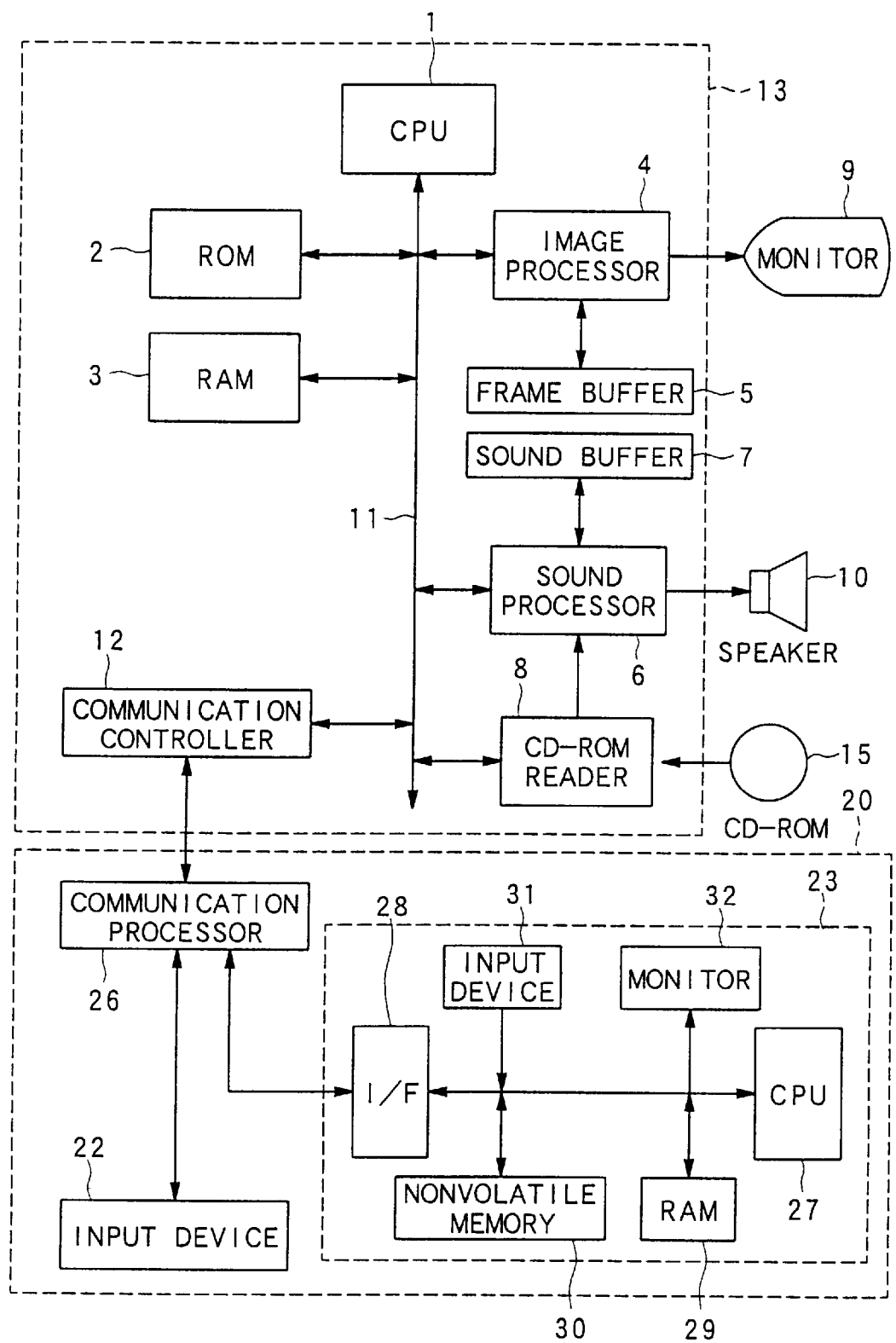
FIG. 1 is a functional block diagram of a home video game system according to one embodiment of the present invention.

FIG. 1 shows an embodiment in which the present invention is constituted as a home video game machine. The home video game machine executes a predetermined game in accordance with a game program and data recorded on a CD-ROM 15 serving as a storage medium.

This game machine has a CPU 1 constituted to mainly consist of a microprocessor as well as a ROM 2, a RAM 3, an image processor 4, a sound processor 6 and a CD-ROM reader 8 which are connected to the CPU 1 through a bus 11. An operating system serving as a program necessary to control the overall operation of the game machine is written into the ROM 2. The RAM 3 provides a working space for the CPU 1. A game program and data read from the CD-ROM 15 serving as a storage medium and various information such as arithmetic operation results and the like of the CPU 1 are written into the RAM 3. The image processor 4 receives image data from the CPU 1, draws the game picture of one frame corresponding to the image data on a frame buffer 5 and outputs video reproduction signals corresponding to the drawn game picture on a monitor at a predetermined timing. The sound processor 6 reproduces data such as voice and musical sound, sound source data and the like read from the CD-ROM 15 and recorded on a sound buffer 7 and outputs the reproduced data from a speaker 10. The CD-ROM reader 8 reads the program and data recorded on the CD-ROM 15 in accordance with an instruction from the CPU 1 and outputs signals corresponding to the read contents. The program and data necessary to execute the game are recorded on the CD-ROM 15. A home television receiver and a built-in speaker of the television receiver are normally used as the monitor 9 and the speaker 10, respectively.

It is noted that FIG. 1 shows the constitution of the control system of the game machine in a simplified manner. Actually, the bus 11 is sometimes divided into a plurality of segments including buses dedicated to memory access and image data. In addition, although various control devices such as a bus controller and a DMA controller are connected to the bus 11 in the actual game machine, the details of those devices are not shown.

Further, a communication controller 12 is connected to the CPU 1 through the bus 11. The CPU 1, the ROM 2, the RAM 3, the image processor 4, the frame buffer 5, the sound processor 6, the sound buffer 7, the CD-ROM reader 8 and the communication controller 12 are contained integrally in a predetermined housing and constitute a game machine main body 13. This game machine main body 13 functions as the computer or controller of a game system. The communication controller 12 comprises an external equipment connection terminal (not shown) exposed externally of the game machine main body 13 and controls the communication between an external equipment connected to the terminal and the game machine main body 13 (or CPU 1, in particular).

Figure 2:
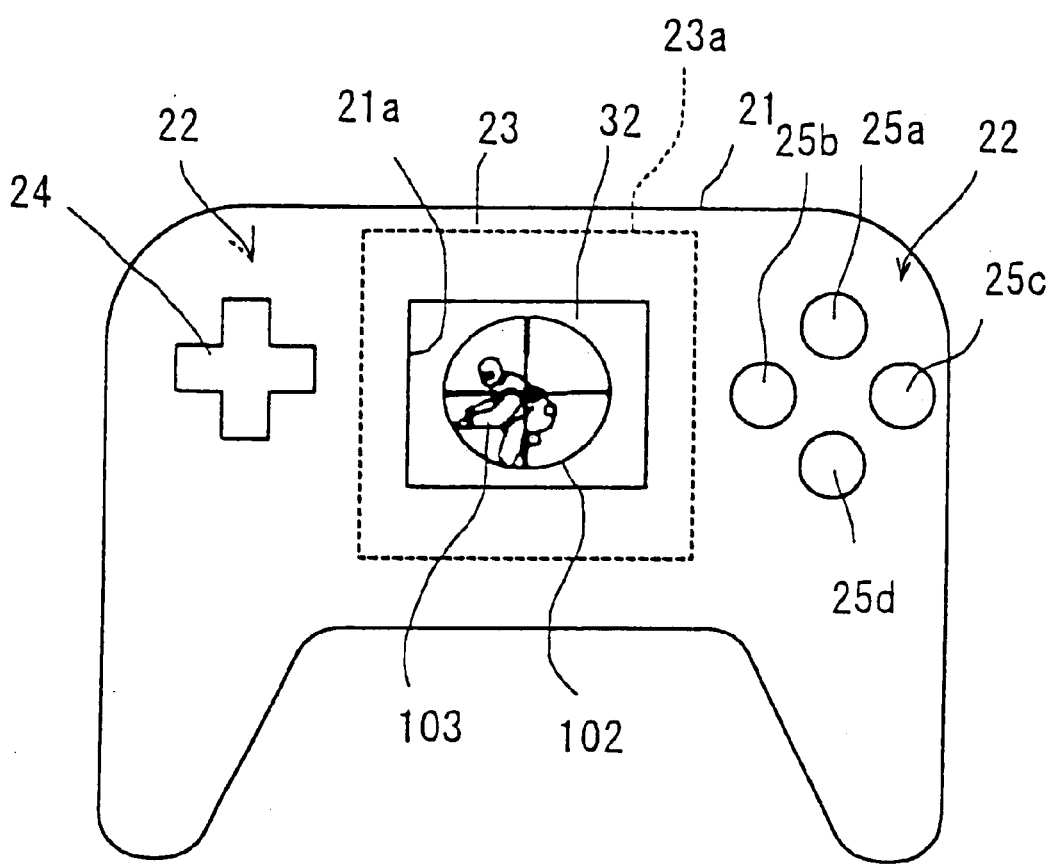
FIG. 2 is a front view of a generalized game controller connected, as an external connection equipment, to a game machine main body of the game system shown in FIG. 1.

Various external equipment can be connected to the communication controller 12 as long as the equipment satisfies a preset standard. FIG. 1 shows a state in which a game controller 20 is connected, as one of the external equipment, to the communication controller 12. Also, FIG. 2 shows the outside view of the game controller 20. As shown in these figures, the game controller 20 has a housing 21, an input device 22 attached to the housing 20 and a portable information terminal 23 installed to a predetermined position in the housing 21. The housing 21 is designed on the premise that a player holds the housing 21 with both hands. The input device 22 has a plurality of operation members operated by the player. In the example of FIG. 2, a crisscross direction indicator key 24 and four push button switches 25a to 25d arranged crisscross are provided as the operation members. The arrangement and the number of the operation members may be appropriately changed. Joy stick type operation members may be provided. The operation members may be provided not only on the surface of the housing 21 but also at various positions. The portable information terminal 23, which is covered with a housing 23a separate from the housing 21, includes a power battery therein and can be used as a portable game machine, an information communication terminal or the like if detached from the housing 21. The portable information terminal of this type is well known as a PDA (Personal Digital (or Data) Assistant).

As shown in FIG. 1, a communication controller 26 for controlling communication with the game machine main body 13 is integrated into the game controller 20. A signal corresponding to the operation state of the above-stated input device 22 is fed to the game machine main body 13 through this communication controller 26. A CPU 27 is integrated into the portable information terminal 23. When the portable information terminal 23 is installed into the housing 21 of the game controller 20, the CPU 27 is connected to the communication control device 26 through a predetermined interface (I/F) 28. It is thereby possible to communicate information between the CPU 27 of the portable information terminal 23 and the game machine main body 13. Further, the portable information terminal 23 is provided with a RAM 29 providing a working space and the like for the CPU 27, a nonvolatile memory 30 for storing game data and the like and storing a program, data and the like to function the portable information terminal 23 as a game machine or the like by a player, an input device 31, a monitor and the like. The input device 31 is constituted, as in the case of the input device 22, with a combination of a direction indicator key and push switches. Although a liquid crystal panel is typically used as the monitor 32, the other display device may be used. As shown in FIG. 2, when the portable information terminal 23 is installed into the housing 21, the monitor 32 can be observed from externally through a window section 21a of the housing 21. Thus, the player who holds the housing 21 can easily recognize the display content of the monitor 32.

Figure 3:
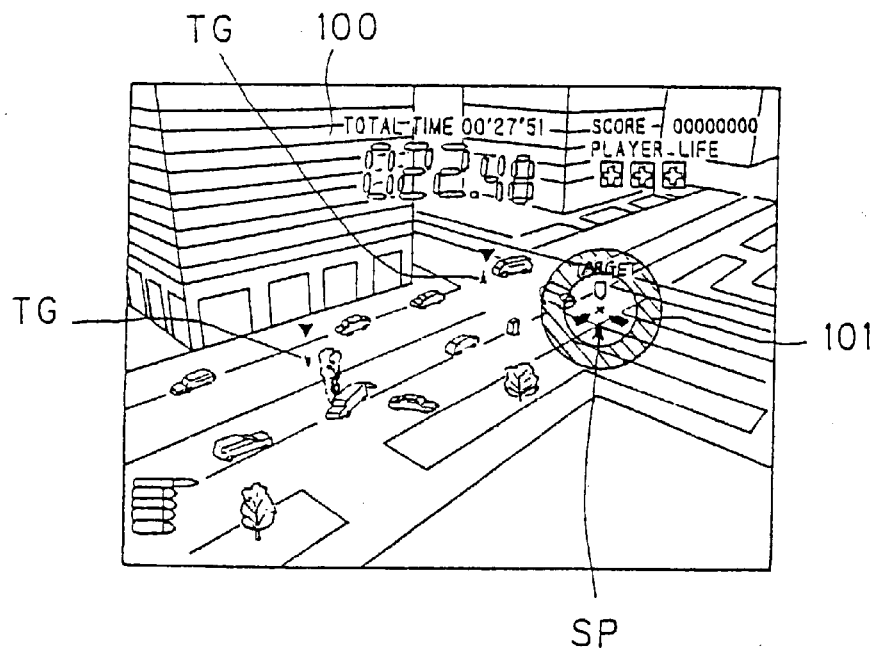
FIG. 3 is a view showing one example of a game field image.

FIG. 3 shows one example of a game field image displayed on the monitor 9 for a shooting simulation game executed by the CPU 1 in accordance with the game program recorded on the CD-ROM 15. A game field image 100 is constituted as a three-dimensional image drawn from the viewpoint of a shooter set as an operation target of the player (which shooter will be referred to as "virtual shooter" hereinafter) and includes at least one target (e.g., very important person, security guard thereof or the like) TG. While the game field image 100 in FIG. 3 shows a street of big business buildings, various game field images are prepared on the CD-ROM 15 and appropriately selected according to the circumstance of a game.

A marker 101 indicating a position (or sight position) at which the virtual shooter aims is displayed on the game field image 100. The center of the marker 101 corresponds to a sight position SP, which SP moves vertically and horizontally in the game field image 100 in accordance with a predetermined position select operation for the input device 22 of the game controller 20. If a predetermined trigger operation is conducted to the input device 22 of the game controller 22 while the sight position SP and the target TG are accorded with each other, a virtual shot is fired and the target can be sniped at. If the sniping fails, the player incurs a penalty including a counterattack from an adversary. If the player can win a shooting record equal to or higher than a predetermined level within a time limit, a stage is cleared and the player can go to the next stage. If the virtual shooter is sniped by the adversary, however, the game is over.

According to the above-stated game, the game controller 20 is designed in a pad fashion while a priority is given to the versatility of the controller for allowing the controller to be used for various genres of games, with the result that a sight which is a shooting simulation dedicated element is not provided on the game controller 20. Accordingly, as long as the game controller 20 is used, it is impossible to provide the same environment as that of actual shooting, in which the player checks the enlarged image of the neighborhood of the sight position through the sight as provided in the conventional shooting simulation game, to the player.

Figure 4:
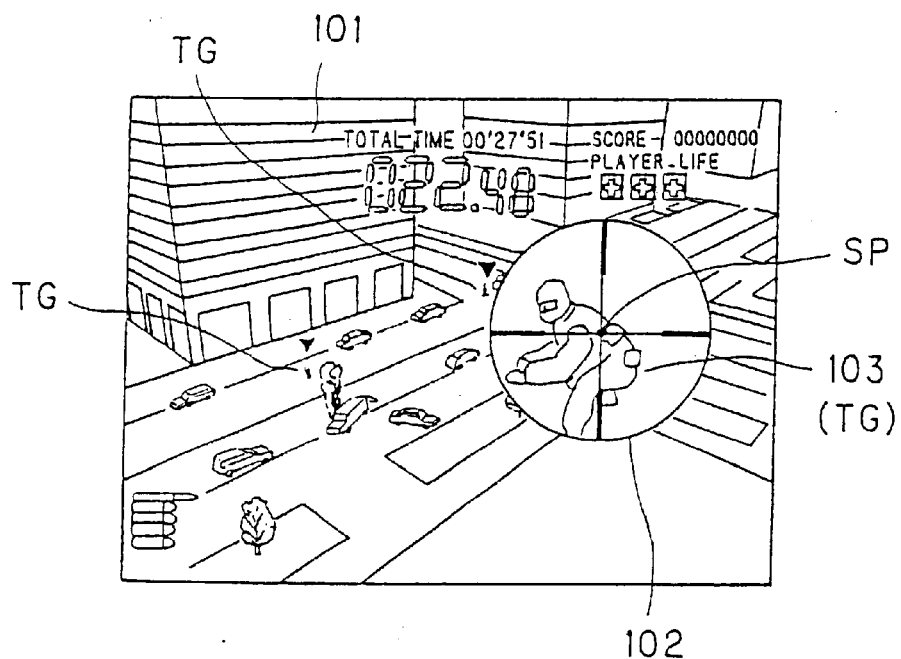
FIG. 4 is a view showing a state in which a scope image as an enlarged image relative to the image shown in FIG. 3 is displayed.

To solve these shortcomings, according to the shooting simulation game in this embodiment, the player conducts a predetermined display switch operation to the input device 22 of the game controller 20, thereby making it possible to alternatively select one of a state in which the marker 101 is displayed as shown in FIG. 3 and a state in which a round scope image (or enlarged image) 102 instead of the marker 101 is superposed on the game field image 100 and displayed as shown in FIG. 4. The scope image 102 shows that a fixed range centered around the sight position (corresponding to the center of the marker 101) SP indicated by the marker 101 in the game field image 100 is enlarged compared with the game field image 100. The display position of the scope image 102 is set so that the center of the image 102 accords with the sight position SP. In the example of FIG. 4, an adversary shooter 103 serving as the target TG is projected on the scope image 102. By displaying such a scope image 102, it is possible for the player to experience a sense of shooting using the sight from a remote place.

Meanwhile, if the scope image 102 is superposed on the game field image 100 and then displayed, the game field image 100 cannot be checked unless the scope image 102 is switched to a non-display state with respect to the superposed position. For the purpose of overcoming such inconvenience, the following features are provided with regard to the display of the scope image 102 in this embodiment.

Figure 5:
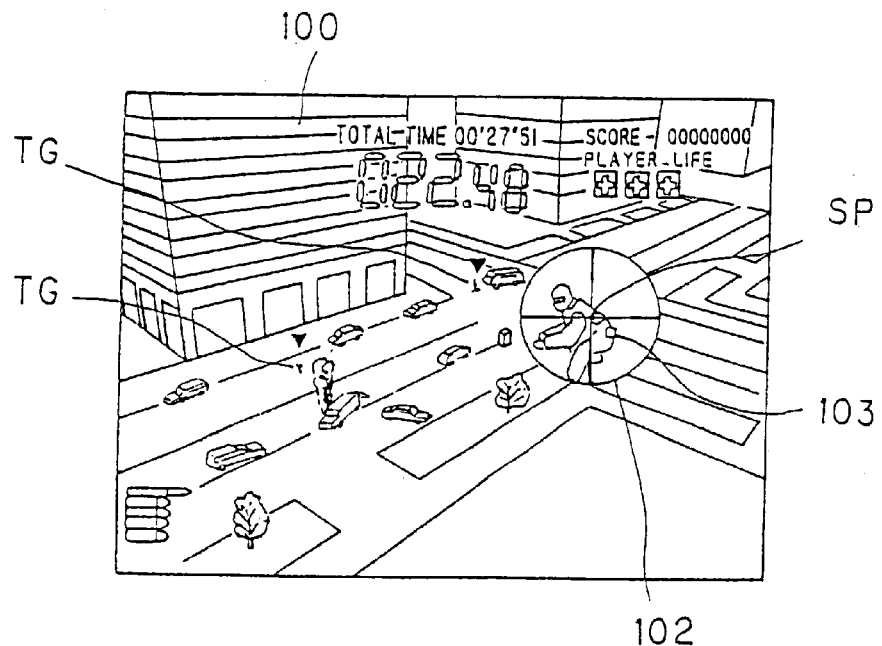
FIG. 5 is a view showing a state in which the magnification of the scope image shown in FIG. 3 is reduced.
Figure 6:
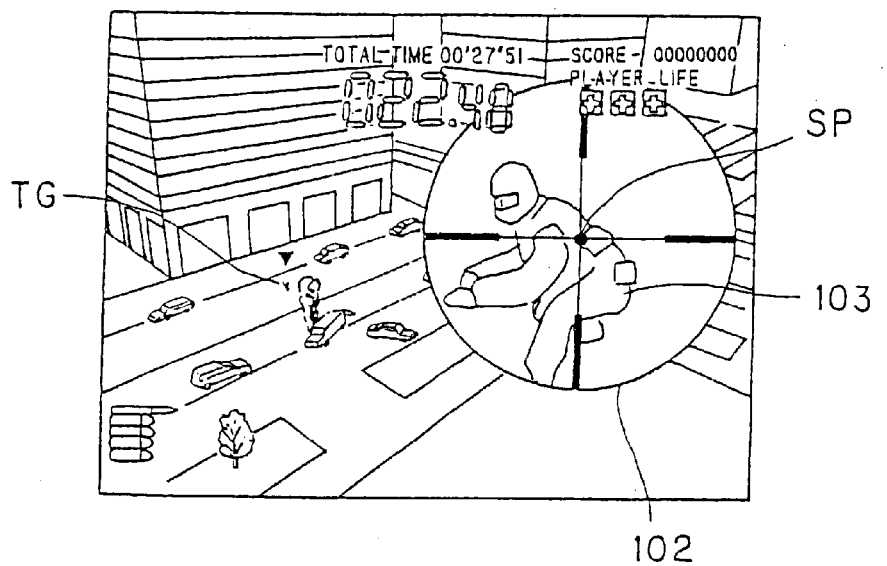
FIG. 6 is a view showing a state in which the magnification of the scope image shown in FIG. 3 is increased.

First, if the player conducts a predetermined magnification change operation to the input device 22 of the game controller 20 while the scope image 102 is being displayed, the magnification (or magnifying power) of the scope image 102 relative to the game field image 100 is allowed to be continuously changed. FIG. 5 shows a state in which the magnification is adjusted to be lower than that of FIG. 4 and FIG. 6 shows a state in which the magnification is adjusted to be higher than that of FIG. 4. The magnification referred to herein is a value (L2/L1) obtained by dividing a dimension (e.g., height) L2 of a specific image projected on the scope image 102 in one direction by a dimension L1 of the same image on the game field image 100 in the same direction. Also, the range projected on the scope image 102 is fixed regardless of magnification. Namely, the angle of view of the scope image 102 is kept constant regardless of the change of the magnification.

In this way, if the magnification of the scope image 102 can be adjusted while the angle of view thereof is kept constant, the range in which the game field image 100 is concealed by the scope image 102 can be adjusted to the preference of the player. For example, if a priority is to be given to the checking of the game filed image 100, the magnification of the scope image 102 may be set low and if a priority is to be given to aiming at the target using the scope image 102, the magnification of the scope image 102 may be set high.

Further, as a feature of this embodiment relating to the display of the scope image 102, if the player conducts a predetermined transparency change operation to the input device 22 of the game controller 20, the transparency (which is sometimes referred to as transmittance) of the scope image 102 is continuously changed. The transparency of the scope image 102 means a degree to which a player can observe the game field image 100 at the back of the scope image 102 through the scope image 102. If the transparency is 0%, the field image 100 cannot be observed at all at the back of the scope image 102 and if the transparency is 100%, the scope image 102 disappears. The transparency may be adjustable between 0 and 100% or may be adjustable in a range limited to be narrower than the range of 0 to 100%. If a transparency of 100% is allowed, the scope image 102 is not displayed on the game field image 100 even if the display of the scope image 102 is turned on (i.e., into a display select state) and the player may possibly feel confused. The maximum value of the transparency may be, therefore, set at a limit value (less than 100%) by which the player can recognize the presence of the scope image 102.

It is noted that the transparency processing conducted to the scope image 102 (which means that the scope image 102 is displayed in a semitransparent state) can be realized by synthesizing a value for designating the colors of each pixel included in the scope image 102 (which value is expressed by one integer of 0 to 255 for respective colors of, for example, R, G and B) and a value for designating the color of each pixel included in a range in which the scope image 102 is superposed on the game field 100 according to the transparency. Such a transparency processing is well known as a blending in the field of computer graphic technology. The detail of the transparency processing is not, therefore, described herein.

Figure 7:
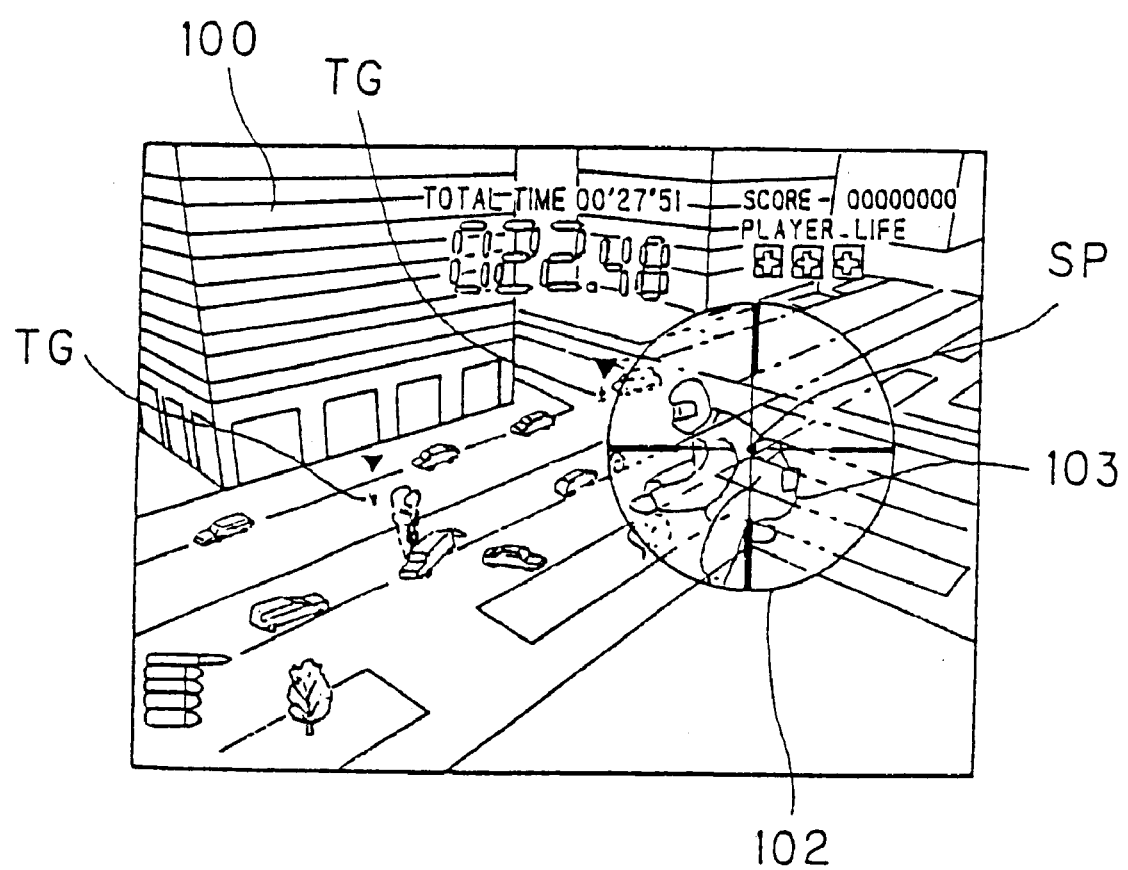
FIG. 7 is a view showing a state in which a transparency processing is conducted to the scope image shown in FIG. 3.

As stated above, if the transparency processing is conducted to the scope image 102, the player can check both the scope image 102 and the game field image 100 on which the scope image 102 is superposed simultaneously as shown in FIG. 7. Due to this, even if the scope image 102 is displayed to be superposed on the game field image 100, the visibility of the game field image 100 is not hampered. Further, since the transparency is made adjustable, the player can freely adjust the transparency of the scope image 102 depending on the circumstances such as a circumstance where a priority is put on which image, the scope image 102 or the game field image 100, thereby making it possible to maximize the function and advantage obtained by the transparency processing.

In this embodiment, besides the magnification and the transparency adjustment function regarding the scope image 102 stated above, the scope image 102 is also displayed on the monitor 32 of the portable information terminal 23 installed to the game controller 20 as is obvious from FIG. 2. By doing so, the player can easily, surely obtain necessary information while comparing the scope image 102 displayed on the monitor 32 of the game controller 20 near at hand with the game field image 100 displayed on the monitor 9 remote from the game controller 20. In case of setting the scope image 102 to be in a non-display state on the monitor 9, in particular, the player can promptly shoot by checking whether the target TG accords or disaccords with the sight position SP by the scope image 102 on the monitor 32 while moving the marker 101 to grope for the target TG.

The scope image 102 may be displayed on the monitor 32 whether or not the scope image 102 is displayed on the monitor 9, the scope image 102 may be displayed on the monitor 32 only if the scope image 102 is displayed on the monitor 9 or the scope image 102 may be displayed on the monitor 32 only if the scope image 102 is not displayed on the monitor 9. The magnification and angle of view of the scope image 102 on the monitor 32 may be fixed. Since the game field image 100 is not displayed on the monitor 32, the transparency of the scope image 102 on the monitor 32 may be fixed to 0%.

Next, description will be given to one example of processings executed by the CPU 1 to control the display of the scope image 102 as stated above.

If a shooting simulation game is executed in the above-stated game system, the CPU 1 repeats arithmetic operations necessary to specify the shooting situation of the virtual shooter and the operation of the target while referring to the player's operation conducted to the input device 22 of the game controller 20. The CPU 1 then executes various arithmetic operations (e.g., the arithmetic operation of the coordinate of a polygon constituting the target) necessary to make the game field image 100 and the scope image 102 reflecting these operation results, appear on the monitor 9. Part of these arithmetic operations is often executed by a dedicated operation unit provided in the image processor 4. The operation results thus obtained are gathered for each of predetermined cycles and image data on each frame is generated. Based on the image data, analog video signals are outputted from the image processor 4 to the monitor 9, and the game field image 100 and the scope image 102 are thereby formed on the monitor 9.

Display permission information for designating whether or not the display of the scope image 102 is permitted, sight position information for designating the coordinate of the sight position which is at the center of the scope image 102, magnification information for designating the magnification of the scope image 102 and transparency information for designating the transparency of the scope image 102 are created, as information necessary for arithmetic operations to draw the scope image 102, and stored in a predetermined area of the RM 3. If various operations associated with the display of the scope image 102 are conducted to the input device 22 of the game controller 20, the CPU 1 executes predetermined interrupt processings so as to update the above-stated various information in response to the various operation thus conducted. Some examples of the interrupt processings will be described with reference to FIGS. 8 to 11.

Figure 8:
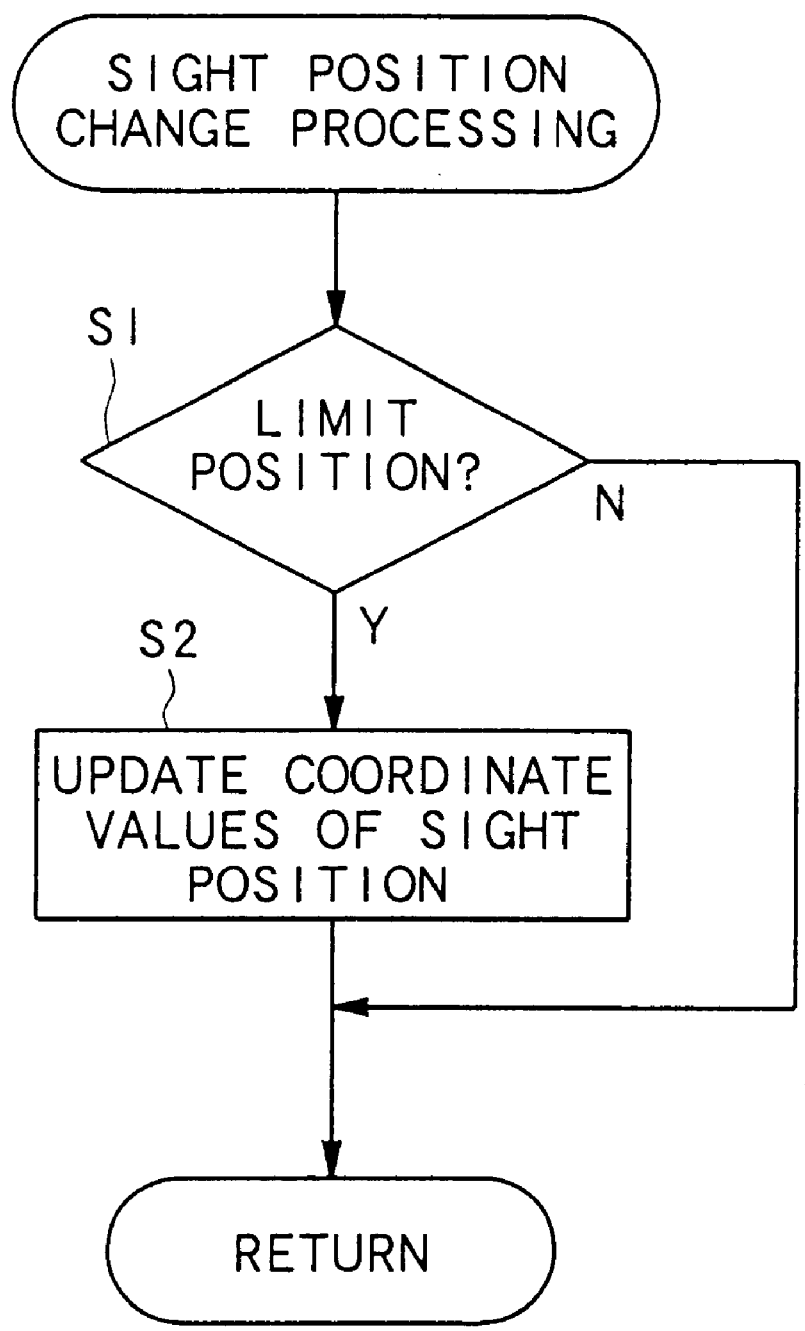
FIG. 8 is a flow chart showing processing procedures executed by a CPU to change a sight position in the game field image shown in FIG. 3.

FIG. 8 shows a processing when a position select operation is conducted to the input device 22. The position select operation is an operation for moving the sight position in the game field image 100 vertically or horizontally in the screen. For example, an operation for indicating vertical and horizontal directions using the direction indicator key 24 may be allotted to the position select operation. If the position select operation is conducted, the CPU 1 first judges whether or not the present sight position is a critical position (e.g., the outer periphery of the image 100) with respect to the sight position moving direction indicated by the position select operation (in step S1). If the sight position is not the critical position, the CPU 1 updates the sight position information so that the sight position moves in the direction indicated by the select operation (in step S2). If the sight position is the critical position, the CPU 1 does not update the coordinate. As a result, the processing of FIG. 8 is completed.

Figure 9:
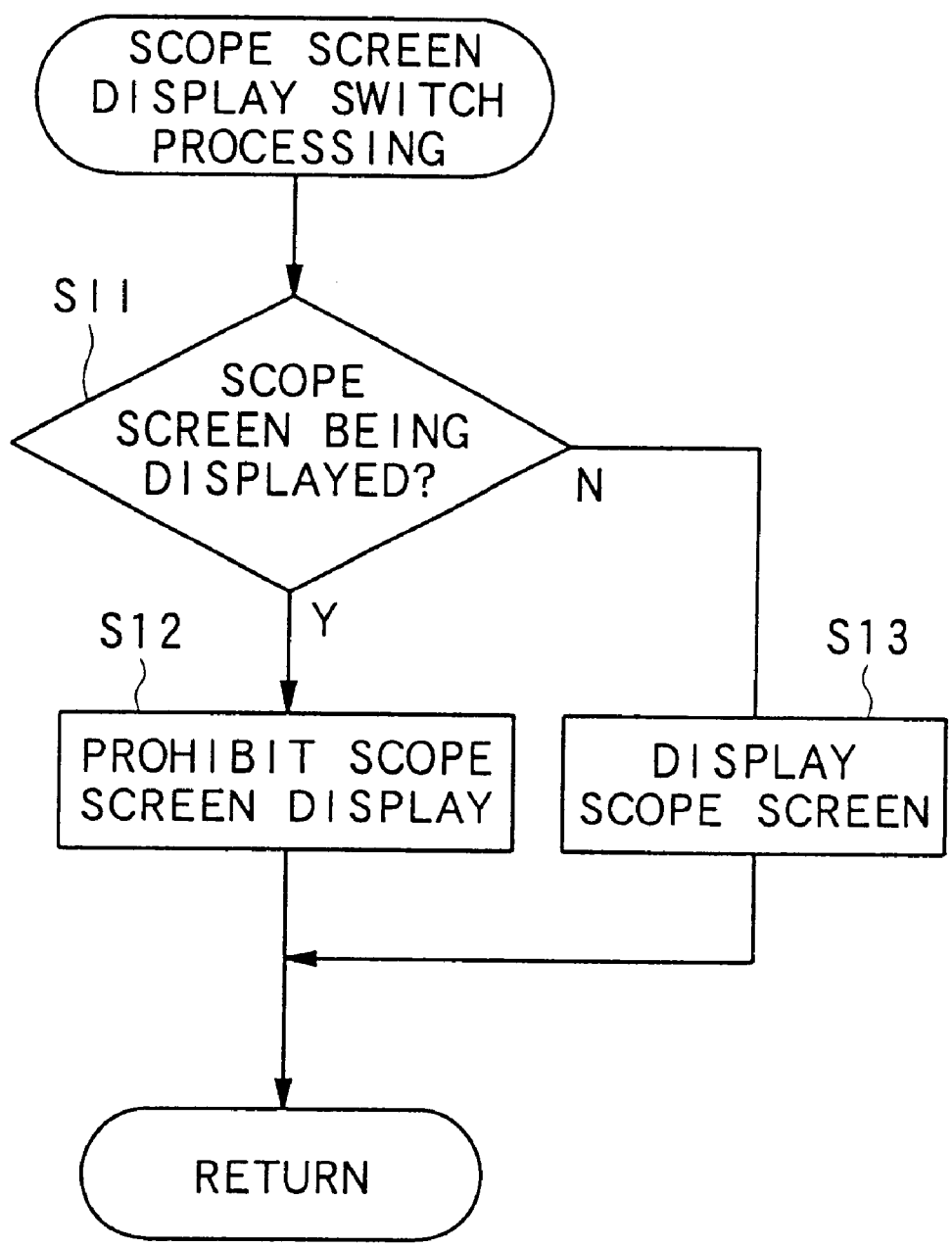
FIG. 9 is a flow chart showing processing procedures executed by the CPU to switch over display/non-display of a scope image with respect to the game field image shown in FIG. 3.

FIG. 9 shows a processing when a display switch operation is conducted to the input device 22. The display switch operation is an operation for select whether or not the scope image 102 is displayed on the monitor 9 and a push operation with any one of the push button switches provided on the input device 22, for example, may be allotted to the display switch operation. If the display switch operation is conducted, the CPU 1 determines whether or not the present display of the scope image 102 is in a permitted state while referring to the display permission information recorded on the RAM 3 (in step S11). If the scope image 102 is in a display permission state, the CPU 1 prohibits the scope image 102 from being displayed on the monitor 9 and, otherwise, updates the display permission information so as to permit the scope image 102 to be displayed on the monitor 9 (in step S12 or S13). As a result, the processing of FIG. 9 is completed.

Figure 10:
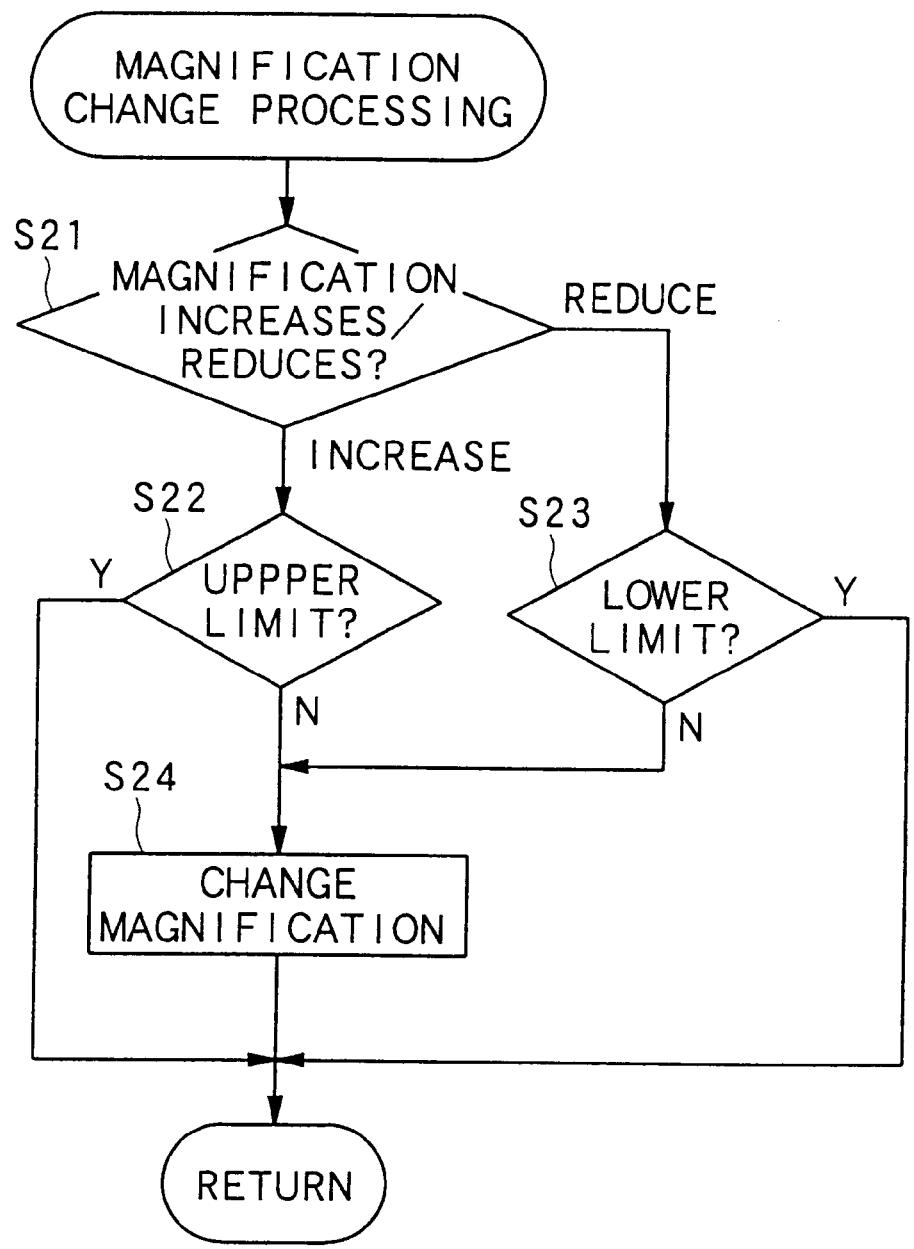
FIG. 10 is a flow chart showing processing procedures executed by the CPU to change the magnification of the scope image shown in FIG. 3.

FIG. 10 shows a processing when a magnification change processing is conducted to the input device 22. The magnification change operation is an operation for increasing or reducing the magnification of the scope image 102. For example, a push operation by any one of the push button switches provided on the input device 22 and a push operation by the other push button switch may be allotted to an operation for indicating the increase of the magnification and an operation for indicating the reduction of the magnification, respectively. If the magnification change operation is conducted, the CPU 1 first judges which indication operation is conducted, the indication of magnification increase or the indication of magnification reduction (in step S21). If judging that the operation is to indicate the increase of magnification, the CPU 1 judges whether the present magnification of the scope image 102 accords with a preset upper limit value (or maximum value) while referring to the magnification information recorded on the RAM 3 (in step S22). If judging that the operation is to indicate the reduction of the magnification, the CPU 1 judges whether the present magnification of the scope image 102 accords with a preset lower limit value (or minimum value) while referring to the magnification information recorded on the RAM 3 (in step S23). If a negative judgment is made in the step S22 or S23, the CPU 1 updates the magnification information so that the designated value of the magnification of the scope image 102 varies with the indication to either increase or reduce the magnification (in step S24) and then finishes the processing of FIG. 10. If an affirmative judgment is made in the step S22 or S23, the CPU 1 does not change the magnification and finishes the processing of FIG. 10.

Figure 11:
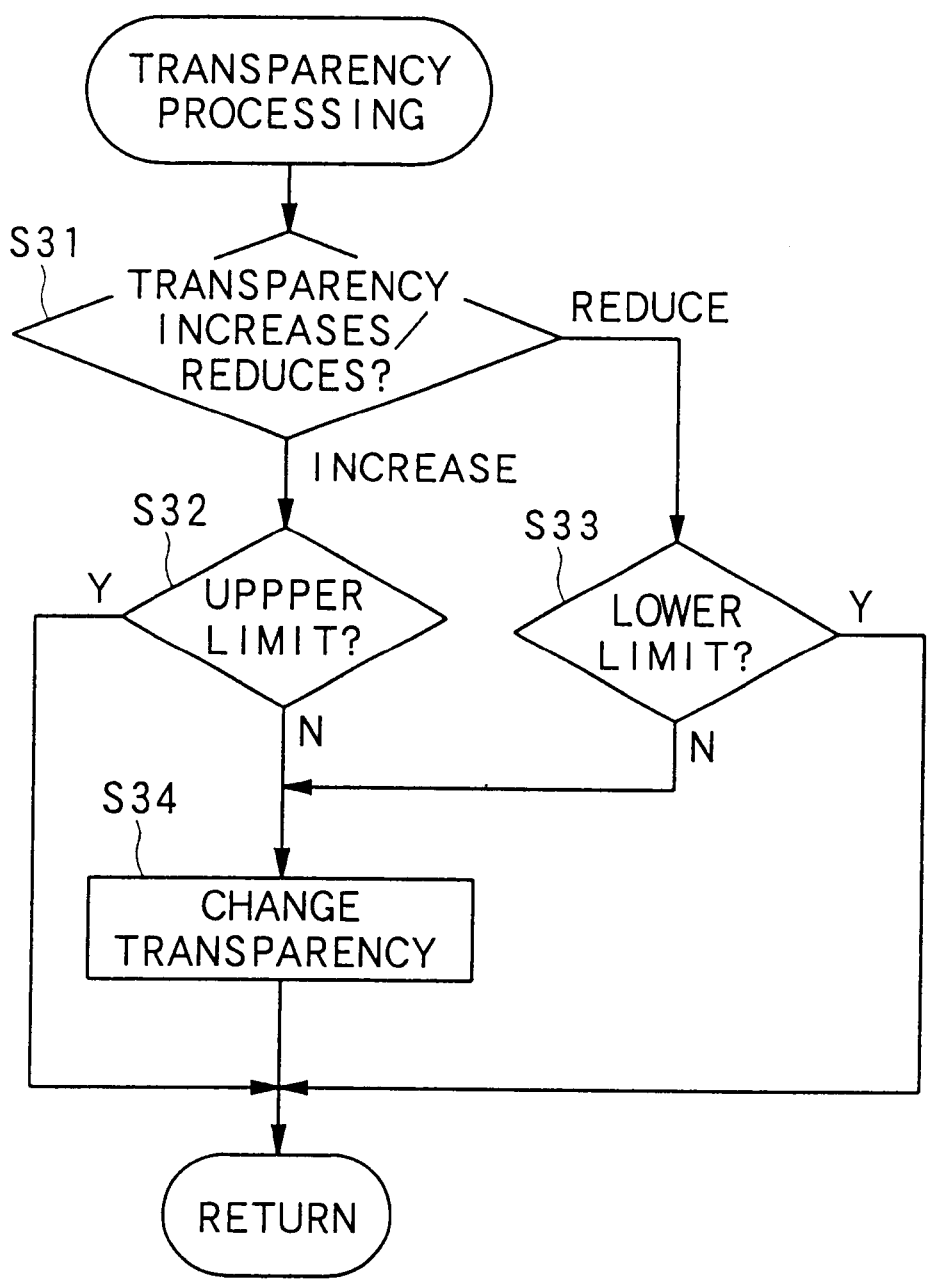
FIG. 11 is a flow chart showing processing procedures executed by the CPU to change the transparency of the scope image shown in FIG. 4.

FIG. 11 shows a processing when a transparency change operation is conducted to the input device 22. The transparency change operation is an operation for increasing or reducing the transparency of the scope image 102. For example, a push operation by any one of the push button switches provided at the input device 22 may be allotted to an operation for indicating the increase of transparency and a push operation by the other push button switch may be allotted to an operation for indicating the reduction of transparency. If the transparency change operation is conducted, the CPU 1 first judges which operation is conducted, the indication of the increase of transparency or the indication of the reduction of transparency (in step S31). If judging that the indication is to increase transparency, the CPU 1 judges whether or not the present transparency of the scope image 102 accords with a preset upper limit value (or maximum value) (in step S32). If judging that the indication is to reduce transparency, the CPU 1 judges whether the present transparency of the scope image 102 accords with a preset lower limit value (or minimum value) (in step S33). If a negative judgment is made in the step S32 or S33, the CPU 1 updates the transparency information so that the designated value of the transparency of the scope image 102 varies with the indication of the increase or reduction of transparency (in step S34) and then finishes the processing of FIG. 11. If an affirmative judgment is made in the step S32 or S33, the CPU 1 does not change the transparency and then finishes the processing of FIG. 11.

Through a series of the processings stated above, the coordinate of the sight position which is at the center of the scope image 102, whether to display the scope image 102 on the game field image 100 and the magnification and transparency of the scope image 102 are set according to the player's indications. The CPU 1 determines the display content of the scope image 102 on the monitor 9 based on these set information and controls the display of the scope 102 on the monitor 9 based on the determination result.

It is noted that the above-stated position select operation, display switch operation, magnification change operation and transparency change operation are allotted to the different operation members of the input device 22 so as to prevent the operations from being mixed with one another.

The present invention is not limited to the home video game system but may be constituted as an arcade game machine or as a network game using the Internet or the like.

As stated so far, according to the game system of the present invention, the magnification of an enlarged image is variable to thereby make adjustable a range in which a game field image and the enlarged image overlap each other, a transparency processing is conducted to the enlarged image to thereby make it possible to observe the game field image in the back or the monitor provided on the generalized pad-like game controller is used as a sub-monitor for displaying the enlarged image. Due to this, even in an environment in which a dedicated controller such as a mimic gun cannot be used, the image showing a game field and the image in which the neighborhood of the sight position set in the game field image is enlarged can be effectively, separately used and the player can grasp appropriate information through the both images.

Further, according to the storage medium of the present invention, a program recorded thereon is read and executed by a computer, thereby making it possible to realize the game system or a control device therefor of the present invention.

What is claimed is:

1. A game system constituted to execute a snipe simulation game where a virtual shot is fired to snipe a target, said game system comprising:

a first display control device for displaying a game field image on a predetermined monitor screen as a space, where the target is hidden, expressed from a viewpoint of a virtual shooter which is a player operation target character;

a sight position select device for changing a sight position in said game field image in accordance with a player's position select operation conducted to a predetermined input device;

a second display control device for displaying an enlarged view relating to a predetermined range including said sight position on said monitor screen, so that said sight position in said enlarged view and said sight position in said game field position accord with each other and said game field image lies in the back of said enlarged view; and a magnification change device for changing a magnification of said enlarged view relative to said game field image with a constant angle of view of said enlarged view in accordance with a player's magnification switch operation conducted to said input device.

2. The game system according to claim 1, wherein said second display control device switches over display and non-display of said enlarged view in accordance with a player's display switch operation conducted to said input device.

3. The game system according to claim 1, further comprising:

a transparency processing device for allowing observation of the game field image in back of the enlarged view by transmitting said enlarged view to a predetermined transparency.

4. The game system according to claim 3, further comprising a transparency change device for changing said transparency of said enlarged view in accordance with player's transparency change operation conducted to said input device.

5. The game system according to claim 1, further comprising a transparency processing device for allowing observation of the game field image in back of the enlarged view by transmitting said enlarged view to a predetermined transparency.

6. The game system according to claim 5, further comprising a transparency change device for changing said transparency of said enlarged view in accordance with player's transparency change operation conducted to said input device.

7. A computer readable storage medium recording a program for allowing a computer constituting a game system for a sniper simulation game where a virtual shot is fired to snipe a target to function as:
  a first display control device for displaying a game field image on a predetermined monitor screen as a apace, where the target is hidden, expressed from a viewpoint of a virtual shooter which is a player operation target character;
  a sight position select device for changing a sight position in said game field image in accordance with a player's position select operation conducted to a predetermined input device;
  a second display control device for displaying an enlarged view relating to a predetermined range including said sight position on said monitor screen, so that said sight position in said enlarged view and said sight position in said game field position accord with each other and said game field image lies in the back of said enlarged view; and
  a magnification change device for changing a magnification of said enlarged view relative to said game field image with a constant angle of view of said enlarged view in accordance with a player's magnification switch operation conducted to said input device.

8. The computer readable storage medium according to claim 7, wherein the program allows the computer to function as:
  a transparency processing device for allowing observation of the game field image in back of the enlarged view by transmitting said enlarged view to a predetermined transparency.

9. A game system constituted to execute a snipe simulation game where a virtual shot is fired to snipe a target, said game system comprising:
  a first display control device for displaying a game field image on a predetermined monitor screen as a space, where the target is hidden, expressed from a viewpoint of a virtual shooter which is a player operation target character;
  a view area select device for changing a view area in said game field image in accordance with a player's view area select operation conducted to a predetermined input device;
  a second display control device for displaying an enlarged view relating to a predetermined range including said view area on said monitor screen, so that said view area in said enlarged view and said view area in said game field image accord with each other and said game field image lies in the back of said enlarged view; and
  a magnification change device for changing a magnification of said enlarged view relative to said game field image with a constant angle of view of said enlarged view in accordance with a player's magnification switch operation conducted to said input device.

10. The game system according to claim 9, wherein said second display control device switches over display and non-display of said enlarged view in accordance with a player's display switch operation conducted to said input device.

11. (Newly Added) A computer readable storage medium recording a program for allowing a computer constituting a game system for a sniper simulation game where a virtual shot is fired to snipe a target to function as:
  a first display control device for displaying a game field image on a predetermined monitor screen as a apace, where the target is hidden, expressed from a viewpoint of a virtual shooter which is a player operation target character;
  a view area select device for changing a view area in said game field image in accordance with a player's view area select operation conducted to a predetermined input device;
  a second display control device for displaying an enlarged view relating to a predetermined range including said view area on said monitor screen, so that said view area in said enlarged view and said view area in said game field image accord with each other and said game field image lies in the back of said enlarged view; and
  a magnification change device for changing a magnification of said enlarged view relative to said game field image with a constant angle of view of said enlarged view in accordance with a player's magnification switch operation conducted to said input device.

12. The computer readable storage medium according to claim 11, wherein the program allows the computer to function as
  a transparency processing device for allowing observation of the game field image in back of the enlarged view by transmitting said enlarged view to a predetermined transparency.

* * * * *